Sept. 26, 1967 J. PLUM 3,343,892
PROPELLER SHAFT BEARING MOUNT
Filed Nov. 30, 1964
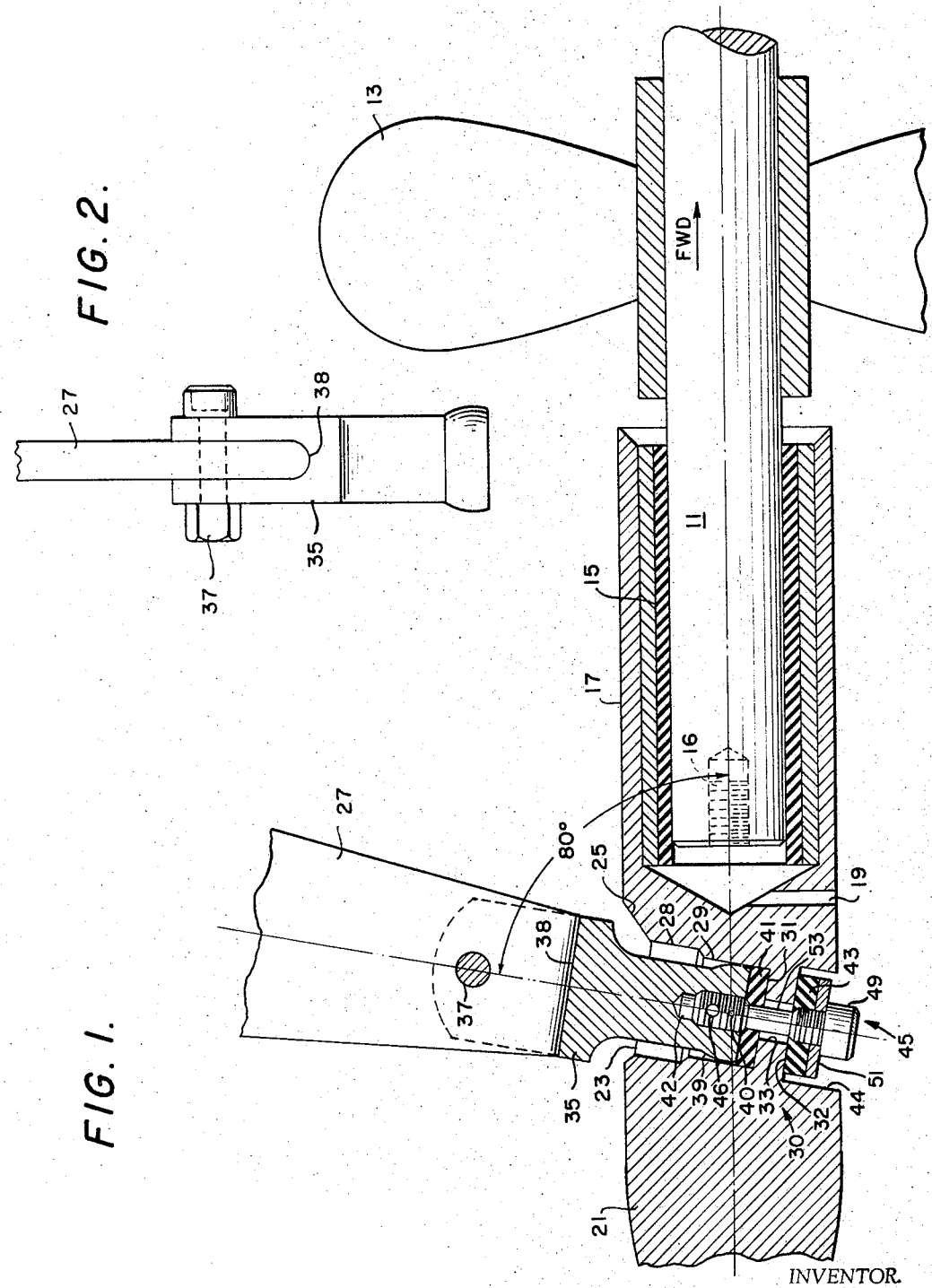
INVENTOR.
JOHN PLUM
BY *O. E. Hodges*
ATTY.
*Albert Topp*
AGENT 3,343,892
PROPELLER SHAFT BEARING MOUNT
John Plum, Montgomery County, Md.
(5402 Tuscarawas Road, Washington, D.C. 20016)
Filed Nov. 30, 1964, Ser. No. 414,928
4 Claims. (Cl. 308—29)

ABSTRACT OF THE DISCLOSURE

A propeller strut and bearing housing located aft of the propeller having a disengageable spherical pivot attachment point between the strut and the housing in alignment with the propeller shaft axis, permitting constant alignment of the shaft bearing with a perturbating shaft and permitting easily propeller replacement.

---

The invention described herein may be manufactured and used by or for the Government of the United States of America for governmental purposes without the payment of any royalties thereon or therefor.

The present invention relates to a propeller strut and bearing of improved construction which can be located aft of the propeller and enable easy exchange of propellers. Previous designs of strut bearing combinations located in this vicinity have required time-consuming labor for making propeller changes.

An object of the present invention is to reduce the noise and vibration which is transmitted by the propeller bracket to the hull and to reduce the strain on the propeller bracket, the shaft and the wear and tear of the bearing of the propeller bracket.

It is well known among the workers in the art that an obstruction of the inflow of water to the propeller will induce vibration and cavitation. Because of the difficulty in exchanging propellers mounted forward of the strut, manufacturers in most cases have been reluctant to provide craft having their propeller so mounted.

It should also be realized that the propeller shaft as well as the hull is greatly affected by dynamic bending forces. For instance, in the case where the shaft is inclined toward the flow under the bottom of a high speed craft, the dynamic lift tends to bend the shaft up into a curve which is concave downward while the magnus effect will tend to bend the shaft transversely. Considering that these bending forces will change with speed, and that they will affect the initial alignment of the shaft . . . it is safe to conclude that a great strain on the strut and shaft is relieved when the alignment of the bearing is practically independent of the strut.

According to the present invention the bearing is connected to the strut (which is affected by the bending and twisting of the hull) in such a manner that it is substantially free to align itself with the propeller end of the shaft.

Briefly stated, there is provided according to the present invention an essentially vertical cylindrical aperture, in a bearing housing which is located at the aft end of the propeller shaft. In the aperture is provided an inwardly protruding transverse shoulder on both sides of which are placed washers of resilient material. The aperture is located directly below a point of connection of a pin connecting the bearing housing to the rigid aft strut. The lower end of the connecting pin has a flat portion resting against the upper of the resilient washers. A lock bolt of the type having a nylon plug in its threaded portion is secured from the lower side of the aperture into a threaded base in the connecting pin.

The lower portion of the connecting pin has a spherical surface portion protruding therefrom. Only the transversely outermost extremity of the spherical surface portion is in intimate contact with the surface of the cylindrical aperture at any one time. The geometrical center point of the spherical surface portion is located at least approximately on the extension of the propeller shaft axis. Therefore, when the shaft moves the bearing housing will follow the movements of the shaft to a limited extent about essentially transverse rotational axes passing through the geometrical center of the spherical surface.

Because the extent of intimate contact between the spherical surface and the surface of the cylindrical aperture is essentially along a circular line contact at all times, there is virtually no possibility of the connecting pin being bindingly locked within the aperture. Therefore, the bearing housing may be separated easily from the connecting pin at all times.

The bearing housing may be easily attached or secured to the connecting pin for essentially the same reason. For prior systems having rectilinearly-fitting elements, an analogous attachment is very difficult because when the propeller shaft is away from the strut, the geometrical path described by the end of the shaft is not a straight line. Since the strut is rigidly attached to the hull, in these prior systems when the shaft is attempted to be brought in register with a connecting arrangement, there results the anomaly of trying to pass linearly fitting elements within or adjacent to each other while the shaft end is being moved curvilinearly.

The present invention overcomes the prior art difficulties and provides the advantageous result that there is virtually no possibility of the propeller bearing housing binding with the connecting pin arrangement provided according to the invention. The bearing housing at all times remains in alignment with the propeller shaft even when the strut follows the bending and twisting of the hull in rougher weather. The flexible or resilient washers along with the spherical shape of the lower end of the connecting pin provide for damped limited movement of the bearing housing in relation to the connecting pin.

It is accordingly among the further objects of the present invention to provide a propeller strut and bearing of improved design which will enable easy exchange of propellers which are mounted forwardly of the strut or combination strut-rudder. It is another object of the present invention to provide a propeller shaft bearing mount of novel construction and which will eliminate the possibility of binding.

Another object of the present invention is the provision of a strut which has the dual role of acting as a rudder and of supporting a propeller shaft in a manner to enable easy removal of the propeller mounted forwardly thereof.

The foregoing objects as well as other object features and advantages of the present invention will be better understood by referring to the following description and accompanying drawings in which:

FIG. 1 is a view in longitudinal cross-section of an improved propeller strut and bearing according to the invention; and FIG. 2 is a view in elevation of the connection of the connecting pin to the strut.

Referring to FIG. 1, a propeller shaft 11 is shown extending from the hull of a vessel on an incline rearwardly toward a propeller 13. The propeller may be secured to the shaft in any suitable manner including those not requiring a lock nut. The aft end of the shaft 11 is rotatably mounted in a bearing 15 of suitable design, such as a bearing of the type having longitudinal grooves manufactured by the Goodrich Rubber Company. The aft end of the shaft 11 may be provided with an axial bore 16 for receiving a member of a jack which may be used for securing the propeller to the shaft. The bearing 15 is mounted within a bearing housing 17 which has a passage 19 for allowing water flow through the bearing.

The bearing housing 17 has a generally faired construction with an integral rearward extremity 21. Located forward of the extremity 21 is an aperture 23 generally vertical in orientation, and having tapered edges 25. The strut to which the bearing housing is to be attached according to the invention is indicated by the reference numeral 27. The strut 27 may be rigidly mounted to the hull. Alternatively, the strut 27 may act as a rudder and for that purposes may be rotatably mounted for movement only about its rotational axis and rigid in all other respects.

A transverse aperture 23 extending completely through the housing 17 is counterbored from both directions to form an apertured web 30 defined by shoulders 31, 32, and small aperture 33. As viewed in FIG. 1, the upper counterbored hole has a large first diameter 28, chamfered into a second smaller diameter 29, terminating in shoulder 31 forming part of the aforementioned web 30. The lower hole is counterbored in the opposite direction on the same axis as the upper hole, terminating in shoulder 33 forming part of the aforementioned web 30.

A connecting pin indicated by the reference numeral 35 is rigidly attached in any suitable manner at its bifurcated upper end to strut 27 such as by means of a bolt as shown in FIG. 2. The bottom of the strut 27 is straight and nestles flushly against a deep groove 38 which forms the bifurcated upper portion of the pin 35. This provides a tight, rigid fit and yet, easy separation of the parts. The portion of the connecting pin 35 immediately below the upper flat portion is appreciably less in diameter than the inside diameter of the aperture portion 23. This difference in diameters enables free movement of the connecting pin 23 within said aperture to a predetermined limited extent.

The lower end of the connecting pin 35 is provided with protruding spherical surface 39 of diameter at its widest point approximately equal to the inside diameter of the aperture 23 at that location. The geometrical center of the spherical surface 39 is indicated at point 40. The spherical surface of the portion 39 of the connecting pin 35 is in intimate contact with the surface of aperture portion 29 along a circle and enables a limited degree of rotational movement of the bearing housing in relation to the connecting pin 35 without causing binding between the members. The spherical shape also provides for a minimum resistance to up and down movement of the connecting pin within the aperture 29 because of a minimum amount of frictional surface area contact between the inner surface of the aperture 29 and the spherical surface 35.

The transverse bottom of the connecting pin 39 has a flat surface and rests against a washer 41 which is made of a resilient material. The pin 35 has an axial threaded bore 42 entering its bottom. The washer 41 rests between the top of the shoulder portion 31 of web 30 and a bottom of the connecting pin 35. A resilient washer 43 is provided for location on the lower side of the shoulder 31. The bearing housing 17 has a lower aperture portion 44 coaxial with aperture portion 23 and of the same diameter. To hold the various foregoing elements together, there is provided a commercially available threaded lock bolt 45 which may be of the type made by the Nylock Company of New Jersey. The commercially available bolt 45 has in its extending transversely through its threaded portion a nylon plug 46 which operates in a well known manner to lock said bolt in place when brought home. The Nylock bolt 45 has a head 49 and is provided with washer 51 which hold resilient washer 43 in place. The lock bolt 45 is provided with a non-threaded central portion 53 so that its diameter is considerably less than that of the aperture portion 33 which it juxtaposes. This relation further enables movement of the pin 35 to a limited degree in transverse directions without binding of the bolt. Threading of the bolt 45 in the threaded bore 42 secures the resilient washers 43, 45 tightly and, of course, the bearing housing 17 to the connecting pin 35.

It is appreciated that upon movement of the shaft 11, usually caused by dynamic forces acting on the shaft, the coaction of the spherical surface 39 within aperture portion 29 establishes a center of rotation at fixed point 40 for the bearing housing 17. Vertical movements of the shaft are taken up by the resilient washers 41 and 43 so that the overall effect of the strut-bearing housing arrangement is to provide a fixed reference bearing point about which there is enabled limited, resiliently damped translational and rotational movement of the bearing housing to "follow" shaft movements.

The "following" movement is advantageously carried out without causing frictional binding among the elements. Consequently, when the bolt 45 is removed, the shaft and bearing housing 17 may be dropped along a curvilinear path without binding because the circular line of contact between the spherical surface and the surface of aperture portion 29, although changing, remains of constant diameter due to the spherical shape 39. In other words, the cylindrical surface of aperture portion 29 is in contact with continuously changing circular lines of contact on the surface 39 as the bearing housing 17 is dropped along a curvilinear path. The bearing housing and propeller may be pulled off by any suitable means. This situation exists in reverse when the bearing housing 17 when mounted on the shaft is lifted into place after propeller substitution.

If desired, the bearing housing may be dropped from the strut by removal of the bolt 37.

It is further appreciated that employment of the strut 27 as a rudder does not change the afore-described coaction and cooperation of the elements of the invention. Obviously, the rotation of the strut 27 as a rudder about an axis coaxial with the aperture portion 23, 29 and bolt 45 and including center 40 will not change the orientation of the spherical surface 39 in relation to the aperture portions and to the bearing housing 17.

Therefore, the shaft mounting arrangement of the present invention affords not only easy exchange of propellers mounted forwardly of struts but further enables use of such struts as rudder elements. Advantageously, vibratory shaft movements are taken up by resilient elements in the mounting arrangement so that long life of the parts is enhanced.

Obviously many modifications and variations of the present invention are possible in the light of the above teachings. It is therefore to be understood that within the scope of the appended claims the invention may be practiced otherwise than as specifically described.

What is claimed is:

1. In combination, a propeller shaft strut and bearing housing arrangement for supporting the end of a propeller shaft located aft of the propeller comprising:
    a bearing housing having a coaxial bore in the forward end, said housing being adapted to be coaxial with a propeller shaft;
    a bearing within said bore for radially supporting a propeller shaft;
    a body portion of said bearing housing aft of said bore having a radially counterbored hole therethrough;
    an apertured web in said radially counterbored hole in said body portion;
    a connecting pin rigidly attached to the propeller shaft strut;
    a spherical surface portion formed on the lower end of said connecting pin fitting within said radially counterbored hole so that the geometric center of said spherical portion is approximately at the intersection of an extension of the axis of the propeller shaft and a line of alignment of the strut and said radially counterbored hole;

resilient means located on both sides of said apertured web; and fastening means through said resilient means and apertured web and removably attaching said bearing housing to said connecting pin.

2. The apparatus of claim 1 wherein the strut comprises a movable rudder the axis of rotation of which is coaxial with said line of alignment of said spherical surface.

3. The apparatus of claim 1 wherein the fastening means comprises:

a threaded bolt having a head; and a threaded bore in said connecting pin along the axis thereof adapted to removably receive said threaded bolt.

4. Apparatus according to claim 1 but further characterized by said strut terminating in a straight edge portion and the upper end of said connecting pin terminating in a bifurcated portion for overlyingly receiving the lower portion of said strut;

and locking bolt means extending thru said portions for securing said strut and body together.

References Cited

UNITED STATES PATENTS

| 1,063,388 | 6/1913 | Robbins | 308—29 |
| 1,725,528 | 8/1929 | Keys | 308—72 X |
| 1,894,478 | 1/1933 | Wood | 115—34 |
| 2,582,040 | 1/1952 | Kammritz | 308—27 |
| 3,227,001 | 1/1966 | Reese | 308—26 X |

MARTIN P. SCHWADRON, *Primary Examiner.*

DAVID J. WILLIAMOWSKY, *Examiner.*

N. ABRAMS, R. F. HESS, *Assistant Examiners.*